US008636260B2

(12) United States Patent
Gauger et al.

(10) Patent No.: US 8,636,260 B2
(45) Date of Patent: Jan. 28, 2014

(54) BROOM STABILIZER DAMPER

(75) Inventors: Derek K. Gauger, Berkeley, CA (US); Thomas Heath, Calgary (CA)

(73) Assignee: Product Harmonics, Ltd. (CA)

( * ) Notice: Subject to any disclaimer, the term of this patent is extended or adjusted under 35 U.S.C. 154(b) by 0 days.

(21) Appl. No.: 12/973,219

(22) Filed: Dec. 20, 2010

(65) Prior Publication Data

US 2011/0084193 A1 Apr. 14, 2011

Related U.S. Application Data

(62) Division of application No. 12/399,398, filed on Mar. 6, 2009, now abandoned.

(60) Provisional application No. 61/034,799, filed on Mar. 7, 2008.

(51) Int. Cl.
*F16M 11/00* (2006.01)

(52) U.S. Cl.
USPC .......... 248/687; 248/110

(58) Field of Classification Search
CPC .......... A47G 29/00; A47K 5/00; A47K 5/18; A46B 2200/302; A46B 17/02; A46B 17/08; A46B 15/0095; B25H 3/04; B25H 3/00; B25H 3/006
USPC .......... 248/687, 511, 534, 110
See application file for complete search history.

(56) References Cited

U.S. PATENT DOCUMENTS

| | | | | |
|---|---|---|---|---|
| 569,936 | A * | 10/1896 | Potter | 401/131 |
| 1,501,020 | A * | 7/1924 | Small | 15/248.1 |
| 2,594,955 | A * | 4/1952 | Markowitz | 248/683 |
| 2,894,263 | A * | 7/1959 | Kunkel et al. | 4/420 |
| 3,302,910 | A * | 2/1967 | Williams | 248/511 |
| 3,858,320 | A * | 1/1975 | Neal et al. | 30/323 |
| 3,968,950 | A * | 7/1976 | Gallo | 248/688 |
| 4,017,050 | A * | 4/1977 | Rosenau | 248/534 |
| 4,114,879 | A * | 9/1978 | Oiler | 473/177 |
| 4,637,580 | A * | 1/1987 | Idstein | 248/95 |
| 4,772,507 | A * | 9/1988 | Leo et al. | 428/218 |
| 4,925,149 | A * | 5/1990 | DiFrancesca et al. | 248/687 |
| 5,226,892 | A * | 7/1993 | Boswell | 604/180 |
| 5,316,247 | A * | 5/1994 | Wodka | 248/73 |
| 5,560,138 | A * | 10/1996 | Dentsbier | 43/21.2 |
| 5,647,563 | A * | 7/1997 | Gantner et al. | 248/74.1 |
| 5,692,581 | A * | 12/1997 | Nelson et al. | 182/129 |
| 5,803,079 | A * | 9/1998 | Rogers et al. | 128/207.14 |
| 5,815,894 | A * | 10/1998 | Soriano | 24/510 |
| 5,875,516 | A * | 3/1999 | Blue | 15/248.1 |
| D425,740 | S * | 5/2000 | Daly et al. | D6/522 |
| 6,134,790 | A * | 10/2000 | Watson | 30/326 |
| 6,199,821 | B1 * | 3/2001 | Job | 248/682 |
| 6,375,146 | B1 * | 4/2002 | Painchaud | 248/534 |
| D462,166 | S * | 9/2002 | Chan | D3/219 |

(Continued)

*Primary Examiner* — Bradley Duckworth

(74) *Attorney, Agent, or Firm* — Young, Basile, Hanlon & MacFarlane, PC

(57) ABSTRACT

A stabilizer-damper for stabilizing a broom, mop, or other long-handled device while such device is resting against a countertop or other surface. The stabilizer-damper is a device that provides stabilization to prevent the long-handled device from falling to the floor and also provides a damping effect to lessen the intensity and harshness of the sound if the long-handled device happens to fall to the floor. The stabilizer-damper fits onto the handle and provides a frictional surface to resist movement of the handle.

7 Claims, 5 Drawing Sheets

(56) References Cited

U.S. PATENT DOCUMENTS

| | | | | |
|---|---|---|---|---|
| 6,460,231 | B2 * | 10/2002 | Bourgerie | 24/487 |
| 6,604,715 | B2 * | 8/2003 | Howe | 248/62 |
| 6,668,415 | B2 * | 12/2003 | Rohrig | 15/167.1 |
| 6,758,446 | B2 * | 7/2004 | Bjornrud | 248/110 |
| 6,962,315 | B2 * | 11/2005 | Lee et al. | 248/316.1 |
| 2007/0075212 | A1 * | 4/2007 | Gates et al. | 248/534 |
| 2008/0223997 | A1 * | 9/2008 | Peterson | 248/176.1 |

* cited by examiner

FIG. 1
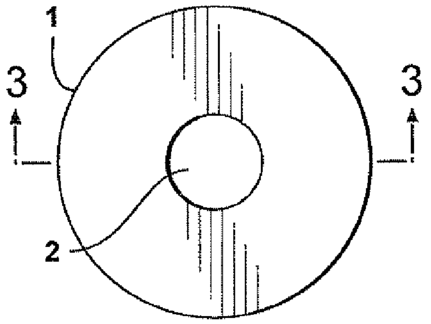
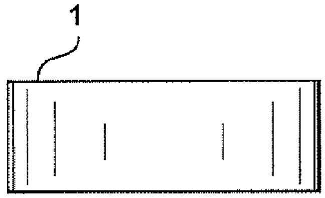
FIG. 2
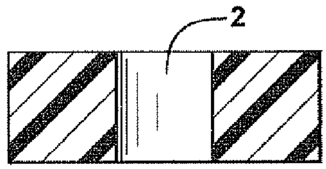
FIG. 3
FIG. 4
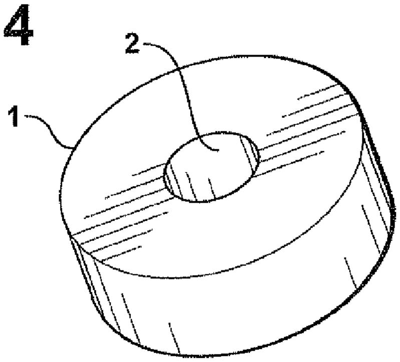
FIG. 5
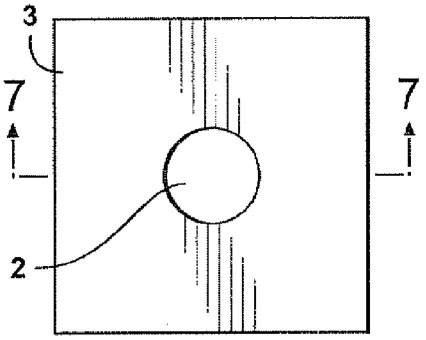
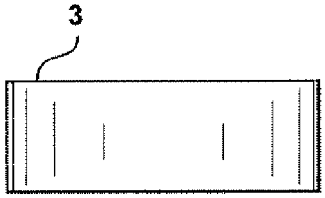
FIG. 6
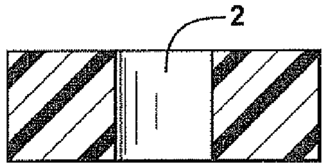
FIG. 7

BROOM STABILIZER DAMPER

CROSS REFERENCE TO CO-PENDING APPLICATIONS

This application is a division of co-pending U.S. patent application Ser. No. 12/399,398 filed Mar. 6, 2009 for a "Broom Stabilizer Damper", which claims priority benefit of the Mar. 7, 2008 filing date of U.S. Provisional Patent Application Ser. No. 61/034,799, for a "Broom Stabilizer Damper", the contents of both which are incorporated in their entirety.

BACKGROUND

The present disclosure generally relates to cleaning products and more specifically to those that employ long handles such as brooms that are commonly found in homes and shops throughout the world.

During everyday cleaning and other activities, people commonly use brooms and other cleaning implements that have long handles. Most of these implements, such as, but not limited to, brooms, manual sweepers, rakes, shovels, other lawn and garden implements, mops, dusters, etc., are frequently used discontinuously. That is to say that the normal usage of these products involves use of the device, setting the device aside for a period of time, and then returning to usage. This is common particularly with brooms in that the usage of brooms is often accompanied by other cleaning activities with different cleaning devices. Also common during this discontinuous usage is that the user leans the long-handled device against a countertop or other similar arrangement such as a shop or garage bench top. In this leaning support condition, the broom or other long-handled device is unstable. This instability is inconvenient in that the user must finesse the device to a stable condition. This, at the least, takes time and also often aggravates the user. Additionally, it's common for the implement to loose its stable position and fall to the floor. When it falls to the floor, it typically makes a loud and undesirable sound.

Therefore there is an unaddressed need for a product that helps to stabilize long-handled devices when they are leaned or propped against a surface and for a product that provides damping to lessen the undesirable effect of noise if and when the device falls to the floor.

SUMMARY

An apparatus for preventing a broom or other long-handled device from falling to the floor or ground when such long-handled device is resting against a wall, countertop, or other surface includes a means for attaching the apparatus to the handle of the long-handled device which is made from a material that has a sufficient coefficient of friction to prevent slippage.

The broom stabilizer-damper has different mounting means. In one aspect, the broom stabilizer-damper simply slips onto the handle in a press-fit arrangement with a circular inside diameter that is slightly smaller than the outside diameter of the handle. Other mounting means are possible such as different inner shapes, a slotted arrangement that allows the stabilizer-damper to be opened for fit to the handle, retained by compression with a "zip tie" in a circumferential fashion, and a press fit arrangement with stiffening ribs. Additionally, another aspect provides for an integral stabilizer-damper-handle grip that slips on over the top end of the handle.

The stabilizer-damper employs a body that may be made from many different materials and in many different shapes that protrudes radially in all directions away from the outside diameter of the handle. The body provides a surface that has very high friction and thus retains the long-handled device when the body rests against a countertop, wall, or other surface. Additionally, should the long-handled device fall to the ground or floor, the body provides damping so as to lessen the sound of impact.

BRIEF DESCRIPTION OF THE DRAWINGS

The various features, advantages and other uses of the present invention will become more apparent by referring to the following detailed description and drawing in which:

FIG. 1 is a plan view of the stabilizer-damper in a round shape, the bottom view being identical;

FIG. 2 is a side elevational view of the stabilizer-damper in the round shape;

FIG. 3 is a cross sectional view along line 3-3 in FIG. 1 of the round stabilizer-damper;

FIG. 4 is a perspective view of the round stabilizer-damper;

FIG. 5 is a plan view of the square stabilizer-damper, the bottom view being identical;

FIG. 6 is a side elevational view of the square stabilizer-damper;

FIG. 7 is a cross sectional view along line 7-7 in FIG. 5 of the square stabilizer-damper;

DETAILED DESCRIPTION

Figure 8:
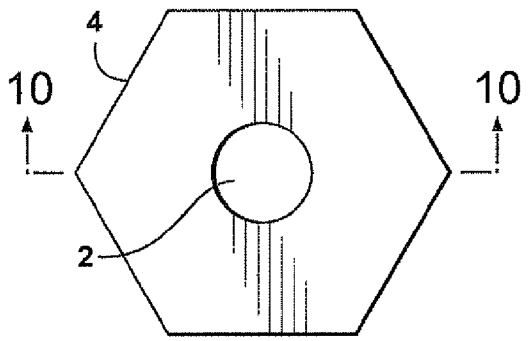
FIG. 8 is a plan view of a hexagonal stabilizer-damper, the bottom view being identical.

This description describes multiple aspects of a broom or long handled device stabilizer damper as illustrated in the drawings. However, there is no intent to limit this disclosure to a single aspect or aspects that are disclosed herein. On the contrary, the intent is to cover multiple alternatives, modifications, and equivalents included within the spirit and scope of this disclosure and as defined by the appended claims.

This disclosure describes several aspects for a stabilizer-damper which is to be installed onto the handle of a long-handled device such as a broom, mop, etc., for the purpose of providing stabilization when the long-handled device is leaning against a surface, such as a countertop, bench, wall, etc. For another purpose but while installed in the same way, the device provides a damping function should the long-handled device fall to the floor as the device lessens the intensity and negative aspects of the sound that such an event produces.

Figure 21:
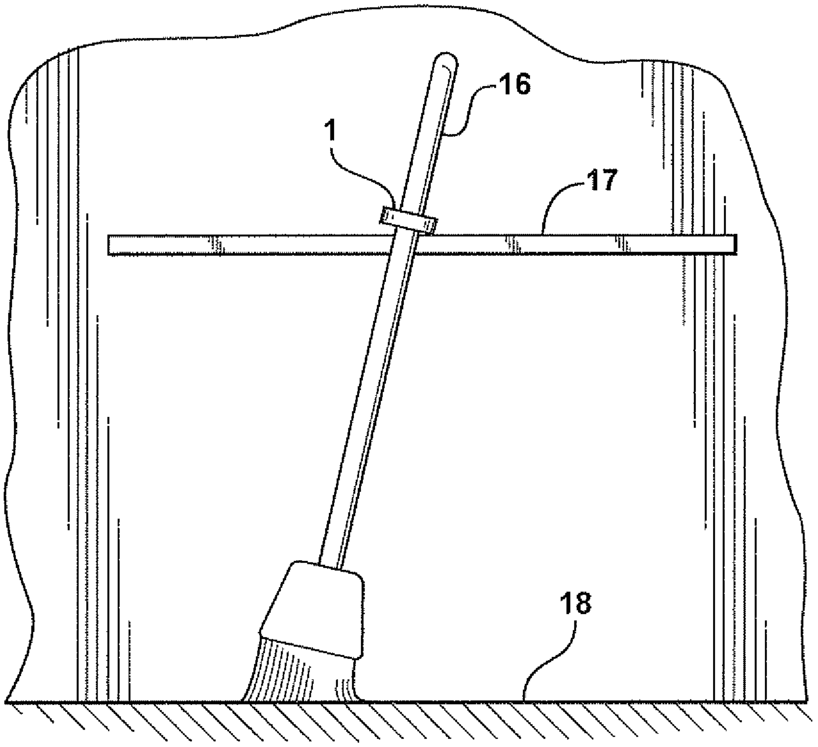
FIG. 21 is a pictorial representation of a stabilizer-damper installed on a broom with the broom leaning on a countertop.

FIGS. 1 through 4 depict a stabilizer-damper 1 that has a round outer shape and a round inner opening 2. The stabilizer-damper 1 attaches to the handle of the long-handled device simply by sliding it over the end of the handle and into a desired position along the length of the handle. The exact position will depend on the height of the surface that it will interface with as well as the angle at which the long-handled device will naturally find equilibrium and will be most stable. FIG. 21 shows the stabilizer-damper 1 in position along the handle 16 and resting on the countertop or other surface 17 with one end of the handle 16 also resting on the floor 18 in a general state of stability and equilibrium.

The stabilizer-damper 1 has a body with an outer edge and an inner bore adapted to be mounted over a handle. The body defines a frictional outer portion which may be a portion or all of an outer surface or outer edge of the body.

One material that can be used to manufacture the stabilizer-damper 1 as well as all of the other aspects of the stabilizer-damper described hereafter is a thermo-plastic elastomer (TPE). TPE materials can easily be molded into a variety of shapes and sizes and come in a vast variety of durometers. Generally, the stabilizer-damper 1 will be made from a soft TPE with a 30-40 durometer rating. This is sufficiently soft enough to provide compliance for installation and for damping the impact and resulting sound in the event that the long-handled device falls to the floor. It will be understood that a number of different materials and durometers are possible for varying applications of the stabilizer-damper 1. Some alternative material types are silicon, rubber, plastic, latex, polyurethane, etc.

FIGS. 5, 6, and 7 depict another aspect of a stabilizer-damper 3 that has a square shape. In all other ways, the stabilizer-damper 3 functions identically to the round stabilizer-damper 1.

Figure 9:
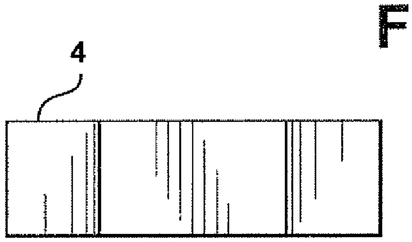
FIG. 9 is a elevational side view of the hexagonal stabilizer-damper.
Figure 10:
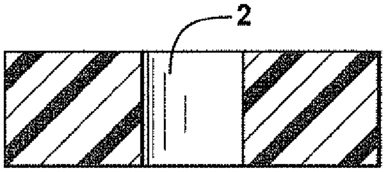
FIG. 10 is a cross sectional view along line 10-10 in FIG. 8 of the hexagonal stabilizer-damper.

FIGS. 8, 9, and 10 depict another aspect of a stabilizer-damper 4 that has a hexagonal shape. In all other ways, the stabilizer-damper 4 functions identically to the round stabilizer-damper 1.

Figure 11:
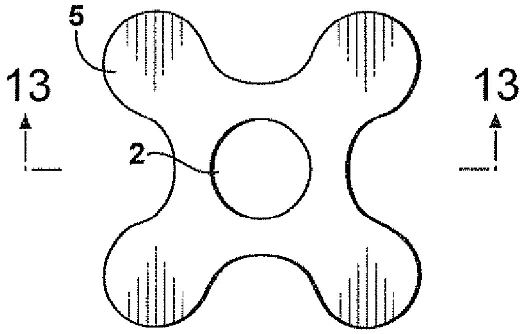
FIG. 11 is a plan view of a stabilizer-damper in a curvaceous shape, the bottom view being identical.
Figure 12:
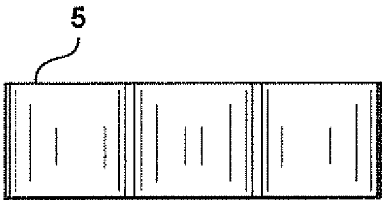
FIG. 12 is a side elevational view of the stabilizer-damper in a curvaceous shape.
Figure 13:
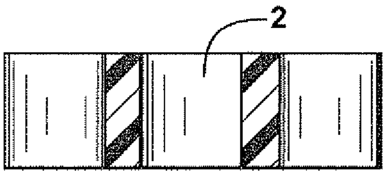
FIG. 13 is a cross sectional view along line 13-13 in FIG. 11, of the stabilizer-damper in a curvaceous shape.

FIGS. 11, 12, and 13 depict another aspect of a stabilizer-damper 5 that has a generally curvaceous shape. In all other ways, the stabilizer-damper 5 functions identically to the round stabilizer-damper 1.

It will be understood that a number of different shapes are possible for the stabilizer-damper family. For instance, in all of the above mentioned aspects, any edge may be sharp or rounded. Additionally, any of the polygonal shapes may have rounded corners. Also, other polygon shapes, such as the triangle, pentagon, etc., are possible as well as amorphous shapes, ovals, ellipses, etc.

Figure 14:
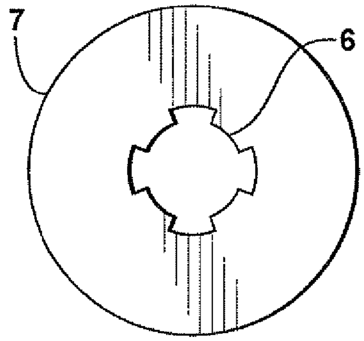
FIG. 14 is a plan view of a round stabilizer-damper with a finger-style mounting configuration the bottom view being identical.

FIG. 14 depicts a round stabilizer-damper 7 that has a finger-style mounting configuration. The stabilizer-damper 7 also attaches to the long-handled device by sliding the stabilizer-damper 7 over the handle 16. The interior shape of the stabilizer-damper 7 employs fingers 6. Although four fingers 6 are shown, any number of fingers is possible. This mounting configuration is useful for long-handled devices that may have an extra device, such as a grip at the top of the handle 16. Additionally, this mounting configuration is useful to make the stabilizer-damper 7 more universal to varying diameter handles 16.

Figure 15:
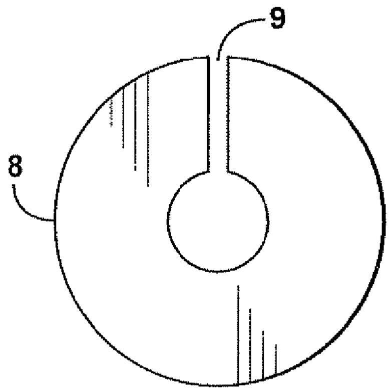
FIG. 15 is a plan view of a round stabilizer-damper with a split-opening style mounting configuration.
Figure 16:
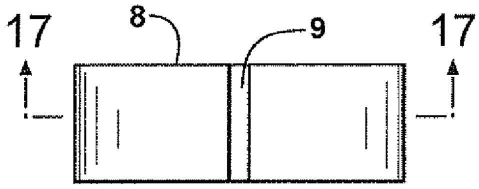
FIG. 16 is a back view of the round stabilizer-damper with a split-opening style mounting configuration.

FIGS. 15 and 16 depict a round stabilizer-damper 8 that has a split-opening mounting configuration. The stabilizer-damper 8 is an incomplete cylinder in that there is a thin opening or slot 9 in the stabilizer-damper 8. The slot 9 may have a constant radial width or a varying width such as a tapered width increasing in span from the inner end to the outer end. This allows the stabilizer-damper 8 to be installed by prying the stabilizer-damper 8 open at the slot, fitting it directly over the handle 16, and then letting the stabilizer-damper 8 retract to a generally round shape. This mounting configuration is useful for the same reasons mentioned above for the finger-style mounting configuration.

Figure 17:
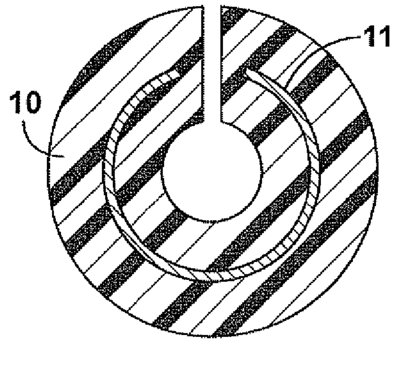
FIG. 17 is a cross sectional view along line 17-17 of FIG. 16 of the round stabilizer-damper with a split-opening-spring style mounting configuration.

FIG. 17 illustrates a variant 10 to the design shown in FIGS. 15 and 16. In this aspect, a stiffening element 11, typically made of spring steel, is inserted or insert molded into the stabilizer-damper 10. This stiffening element 11 stiffens the stabilizer-damper 10 and will generally provide better retention to the handle 16. Many different shapes of the stiffening element 11 are possible as well as many different material options. Additionally, it is possible to manually insert the stiffening element 11 after molding, insert mold it during molding, or co-mold it with two different moldable materials, such as TPE and a stiffer plastic such as nylon, etc.

Figure 18:
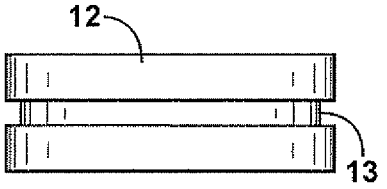
FIG. 18 is a side elevational view of a round stabilizer-damper with a groove style mounting configuration.

FIG. 18 depicts a round stabilizer-damper 12 with a groove style mounting configuration. The groove style mounting configuration will work with any of the styles of stabilizer-dampers previously described. In this configuration, a groove 13 is provided in the outer peripheral surface or edge of the stabilizer-damper 12. The groove 13 allows for the optional installation of a "zip tie" or other device to provide compressive stress on the stabilizer-damper 12. The effect of the compressive stress is to provide better retention to the handle 16.

Figure 19:
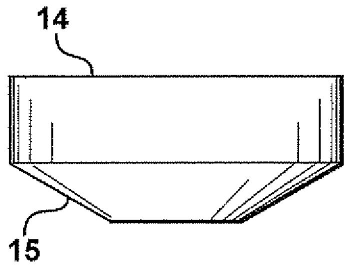
FIG. 19 is a side elevational view of a round stabilizer-damper with an optional bottom bevel shape.
Figure 20:
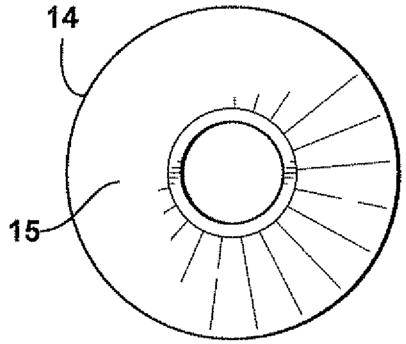
FIG. 20 is a bottom view of the round stabilizer-damper with an optional bottom bevel shape.

FIGS. 19 and 20 depict another feature that may be employed in any of the different shapes of stabilizer-dampers. This configuration employs a beveled shape 15 on the bottom of a stabilizer-damper 14. As can be seen in FIG. 21, most long-handled devices 16 will naturally find equilibrium and stability at an angle different than vertical to the floor 18 and countertop 17 surfaces. The beveled shape 15 provides a stabilizer-damper such as stabilizer-damper 1 with a resting and stabilizing surface along at least two surfaces of the beveled shape 15 rather than a resting and stabilizing edge. This will generally provide greater static friction and will therefore be more impervious to small forces that might upset the stability and equilibrium that would typically cause the long-handled device 16 to fall to the floor.

Figure 22:
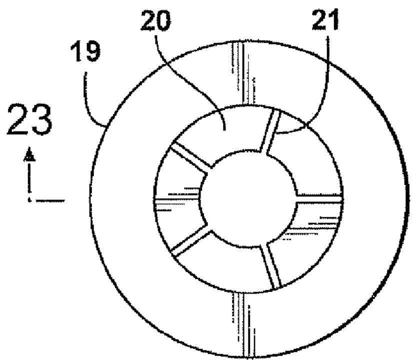
FIG. 22 is a plan view of a round stabilizer-damper with stiffening ribs.
Figure 23:
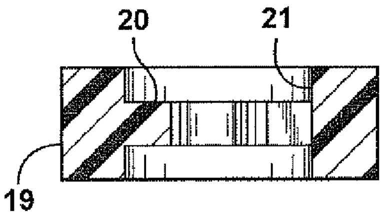
FIG. 23 is a cross sectional view along line 23-23 in FIG. 22 of the round stabilizer-damper with stiffening ribs.

FIGS. 22 and 23 show a stabilizer-damper 19 with another mounting and retention means. In this aspect, the body of the stabilizer-damper 19, an inner web 20, and stiffening webs 21 are all molded from the same material. This design provides for ease of installation and tight retention simultaneously. The inner web 20 is more compliant than the body of the stabilizer-damper 19 typically as shown in FIGS. 1-3. This stabilizer-damper employs one or a multiplicity of stiffening webs 21 that increase the retention by providing resistance to compression during the fitting onto the handle 16. The stiffening webs 21 extend radially outward from the inner diameter to the inner portion of the body of the stabilizer-damper 19.

Figure 24:
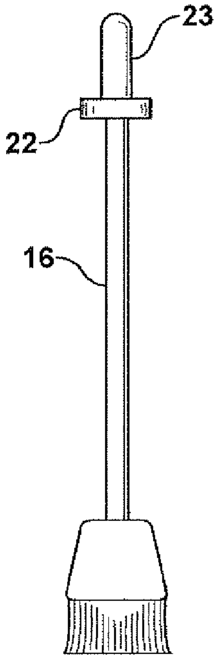
FIG. 24 is a pictorial representation of a stabilizer-damper with an integral handle installed on a broom.

FIG. 24 depicts another aspect in which the stabilizer-damper 22 is integral with and manufactured in conjunction with a handle grip 23. The stabilizer-damper portion 22 of the integrated grip 23 defines a protrusion on the grip 23 and may have any one or more of the features or aspects described above. This design is intended to replace the existing handle grip of the long-handled device, if one exists.

It is also possible to construct the handle grip 23 including the unitary stabilizer-damper 22 as an integral part of the handle, such as in a one piece, molded handle, handle grip 23 and stabilizer-damper 22.

Figure 25:
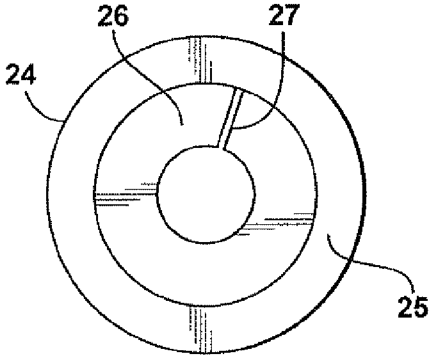
FIG. 25 is a plan view of a two piece aspect of a stabilizer-damper.

In FIG. 25, another aspect of a stabilizer-damper 24 is disclosed which is configured as a two-piece device. A first inner piece, typically being cylindrical in shape, is fabricated to have one open slot 27, extending radially from an outer edge to an inner edge opening to an inner bore. As shown in FIG. 25, the slot 27 extends radially from to the inner bore. The open slot 27, which extends completely through the entire thickness of the first inner piece 26, may be configured to have a generally single, constant width, as shown in FIG. 25, or it may have a varying width from the outer end to the inner end. In this modification, the varying width may extend from a wider width at the outer end of the first inner piece 26 to a narrower or smaller width at the inner end which opens to the inner bore.

A second outer piece or ring 25 separately fits around the outer diameter of the first inner piece 26. The inside diameter of the second outer ring 25 is configured to be slightly smaller than the outside diameter of the first inner piece 26 such that the outer ring 25 expands slightly and the inner piece 26 compresses slightly when the outer ring 25 is forced over the inner piece 26.

This arrangement provides for an installation method that is both flexible to accommodate different handle diameters, since the inner bore of the inner piece 26 can be configured with varying inside diameters, and is easy to install even if the handle has an end fitting, such as a handle grip.

In installing the stabilizer-damper 24, the inner piece 26 is fitted to the handle by either sliding the inner bore of the inner piece 26 over the end of the handle to the desired position along the length of the handle or by opening the slot outer end of the slot 27 and forcing the inner piece 26 over the handle until the handle fits within the inner bore of the inner piece 26. The outer ring 25 is then slid over the end of the handle and into engagement with the outer diameter of the inner piece 26. Resulting compression of the inner piece 26 on the handle caused by the outer ring 25 increases the static friction between the inner piece 26 of the handle and serves to hold the two piece stabilizer-damper 24 in the desired position along the handle.

Additionally, the two piece stabilizer-damper 24 allows the inner piece 26 and the two outer ring 25 to be made of two different materials, or of different materials or of the same material suitably modified to have different hardnesses within the described durometer range, or even from the same material with the same durometer, to maximize the friction at the exterior surface of the outer piece 25, which typically requires a high friction material, and to maximize the retention of the inner piece 26 to the handle which typically requires a somewhat harder or higher durometer material.

For example, the inner piece 26 can be made of TPE and the outer ring 25 can be made of latex or silicone to provide a sticky, high friction outer surface. The two materials would have different durometers. Alternately, the inner piece 26 could be made of 30 durometer TPE and the outer ring 25 of 30 durometer silicon—while still providing a high friction outer surface or edge.

As in all other configurations of the inventive stabilizer-damper, any of the aforementioned shapes and other configurations of the body of the stabilizer-damper 24, such as with or without a bottom end bevel, are applicable to the stabilizer-damper 24.

Various configurations and shapes of a stabilizer-damper have been disclosed and shown in the various drawing figures. It will be understood that every aspect of the stabilizer-damper may be configured with any shape inner bore, such as circular inner bore, fingered inner bore, slotted inner bore or an inner bore formed by an inner stiffening web, as well as any exterior shape, such as annular or cylindrical, polygonal, including square, hexagonal, irregularly shaped protuberances. In addition, the body of the stabilizer-damper may be used with any different inner bore shape or outer edge shape, including the two piece stabilizer damper 24. Similarly, the two piece stabilizer-damper 24 may have any disclosed or equivalent shaped inner bore for the inner piece 26, in a complimentary shaped outer edge of the inner piece 26 and inner diameter bore of the outer piece 25 as well as any exterior shape for the outer piece 25.

What is claimed is:

1. A stabilizer apparatus for use with a long-handled device comprising:

a body including a one piece inner member and a one piece outer member;

the inner member having an outer edge and an inner edge radially spaced from the outer edge, the inner edge defining an inner bore adapted to be mounted over a handle of a long-handled device having an operative end coupled to one of an elongated handle, the handle having an opposed handle end, the body mounted on the handle spaced from the operative end, the operative end adapted to engage a horizontal surface below a vertical surface, the long-handled device being one of a broom, a manual sweeper, a rake, a shovel, a mop, a duster, and lawn and garden equipment, an inner diameter of a bore of the outer member being smaller than an outer diameter of the outer edge of the inner member;

a single slot extending radially through the inner member from the inner edge to the outer edge;

at least the inner member formed of a compressible material such that forced engagement of the outer member over the inner member compresses the inner member and expands the inner bore of the outer member, and the outer member concentrically mountable over and forcibly engaged with the outer edge of the inner member, whereby the outer member compresses the inner member resulting in the inner member being compressed in a circumferential direction to close the slot and urge the inner member into fixed engagement with a handle, and at least a portion of the outer member expands and is engaged to the inner member, the outer member having a frictional outer side portion adapted to minimize movement of the body when the body is engaged with a substantially vertical surface.

2. The apparatus of claim 1 wherein:

the inner and outer members are formed of different materials.

3. The apparatus of claim 1 wherein:

the inner and outer members have different durometers.

4. The apparatus of claim 1 wherein:

the outer member has a durometer of about 30 to about 40.

5. The apparatus of claim 1 wherein:

the inner bore of the inner member has one of a circular shape, an irregular shape, and a fingered shape with at least one projection.

6. The apparatus of claim 1 wherein:

the outer portion has one of a circular, polygonal, curvaceous, elliptical and oval shape.

7. The apparatus of claim 1 comprising:

the outer member having a continuous, unbroken outer circumference.

* * * * *